United States Patent [19]

Merten et al.

[11] 3,968,080

[45] July 6, 1976

[54] N,N'-DIALKYL-P-PHENYLENEDIAMINE MIXTURE

[75] Inventors: Helmut Ludwig Merten, Hudson; Gene Ray Wilder, Medina, both of Ohio

[73] Assignee: Monsanto Company, St. Louis, Mo.

[22] Filed: Oct. 10, 1974

[21] Appl. No.: 513,714

[52] U.S. Cl. .................. 260/45.9 QB; 252/401; 260/814; 526/41; 526/335
[51] Int. Cl.$^2$............................................. C08J 6/00
[58] Field of Search ............... 260/45.9 QB, 814; 252/401

[56] References Cited
UNITED STATES PATENTS

| | | | |
|---|---|---|---|
| 3,419,639 | 12/1968 | Gentile | 260/45.9 |
| 3,427,281 | 2/1969 | Young et al. | 260/45.9 |

*Primary Examiner*—V. P. Hoke

[57] ABSTRACT

Dialkyl-p-phenylenediamine composition comprising first component of symmetrical N,N'-di(sec-hexyl)-p-phenylenediamine in less than 50% by weight of the total composition, second component of unsymmetrical N-(sec-hexyl)-N'-(sec-alkyl)-p-phenylenediamine having 7 or 8 carbon atoms in said sec-alkyl in amount greater than the first component and third component of symmetrical N,N'-di(sec-alkyl)-p-phenylenediamine having 7 or 8 carbon atoms in each alkyl group useful for preservation of organic materials.

8 Claims, No Drawings

N,N'-DIALKYL-P-PHENYLENEDIAMINE MIXTURE

This invention relates to dialkyl-p-phenylenediamine mixtures, to diene elastomers preserved therewith and to the preparation of such mixtures. More particularly, it relates to mixtures of symmetrical and unsymmetrical di-secondary alkyl-p-phenylenediamines, to processes for preparation thereof and to rubber compositions preserved with such mixtures.

BACKGROUND OF THE INVENTION

Di(sec-alkyl)-p-phenylenediamines are powerful anti-oxidants and antiozonants for the preservation of diene rubber. However, the lower members of the series are volatile skin irritants with the result that not only are they rapidly lost from the rubber with resultant loss of preservative action but cause serious discomfort to workmen. Higher members of 7 or 8 carbon atom alkyl groups having high antioxidant and antiozonant properties, acceptable low volatility and low skin burning effect are produced from ketones of 7 or 8 carbon atoms and have become widely accepted in the rubber industry. Unfortunately, ketones of 7 and 8 carbon atoms are limited in supply and expensive. Surprisingly, rubber preserved with dialkyl-p-phenylenediamine from the more available 6 carbon atom ketone, methyl isobutyl ketone, gives evidence of being a skin sensitizer. The ability of an agent to elicit a primary skin irritation is wholly different from that of producing skin sensitization. Moreover, the product from methyl isobutyl ketone is a mixture of stereo isomers which tends to form a semi-crystalline mass on standing.

SUMMARY OF THE INVENTION

In accordance with this invention, it has been found that dialkyl-p-phenylenediamine compositions obtainable from mixtures of 6 carbon atom ketones with 7 or 8 carbon atom ketones are characterized by an unexpectedly high proportion of unsymmetrical dialkyl-p-phenylenediamine and are valuable antidegradants, safe to use, having desirable physical properties. The compositions are antioxidants for diene elastomers, herein designated as "rubber", and other organic materials which deteriorate by absorption of oxygen from the atmosphere. They are also potent rubber antiozonants.

The unsymmetrical N-1,3-dimethylbutyl-N'-1,4-dimethylpentyl-p-phenylenediamine described by C. G. Summers in copending application of even date entitled N-1,3-Dimethylbutyl-N'-1,4-Dimethylpentyl-p-Phenylenediamine Ser. No. 513,712 is a useful antidegradant but expensive to prepare and difficult to separate from the undesirable symmetrical di-secondary hexyl-p-phenylenediamine. The practice of the instant invention contemplates no separation. The preferred compositions are characterized by N,N'-di(sec-hexyl)-p-phenylenediamine content less than 50% by weight of the total composition, unsymmetrical dialkyl-p-phenylenediamine in amount greater than N,N'-di(sec-hexyl)-p-phenylenediamine and a proportion of symmetrical N,N'-di(sec-alkyl)-p-phenylenediamine of 7 or 8 carbon atoms in each alkyl group. Such compositions form directly from reductive alkylation of p-nitroaniline or p-phenylenediamine with a mixture of 6 carbon atom ketone and at least one 7 or 8 carbon atom ketone. It is believed that the undesirable properties of N,N'-di(sec-hexyl)-p-phenylenediamine are suppressed in the mixtures and that the high proportion of unsymmetrical dialkyl-p-phenylenediamine results from the influence of intermediate monoalkylate which favors its formation and from a favorable reactivity relationship between the ketone reactants. The reactivity refers to total reactivity in the sequence of reactions involved in reductive alkylation. Thus, it will be appreciated that the formation of product mixtures having the compositions described is dependent upon unpredictable total reactivities found to be conductive to formation of mixtures having a high proportion of unsymmetrical product. Rubber compositions containing the mixtures exhibit little or no toxicity to human skin.

The preferred 6 carbon atom ketone is methyl isobutyl ketone and the preferred 7 and 8 carbon atom ketones are methyl isoamyl ketone, 2-heptanone and 2-octanone. Other ketones having similar total reactivity ratios may be substituted. The lower ketone is usually within the range of 0.5–3.0 moles per mole of the higher ketone which may itself be a mixture of ketones with 1:1 mole ratio being particularly desirable for producing compositions containing less than 20% of the symmetrical di-secondary hexyl-p-phenylenediamine.

DESCRIPTION OF THE PREFERRED EMBODIMENTS

Mixtures of dialkyl-p-phenylenediamines of the invention preferably are prepared by reductive alkylation of p-nitroaniline (PNA) with a mixture of ketones. Reductive alkylation refers to the well-known process of reacting an amine or nitro body, carbonyl compound, in this instance a ketone, and hydrogen in the presence of hydrogenation catalyst. The following example is illustrative:

To an autoclave equipped with a turbine or other suitable agitator, coil for heating or cooling, thermowell, vents, rupture discs, appropriate sampling device and stainless steel filter is charged 138 parts by weight (1.0 mole) of PNA, 120 parts by weight (1.2 mole) of methyl isobutyl tetone (MIKB), 137 parts by weight (1.2 mole) of methyl isoamyl ketone (MIAK), 6.0 parts by weight of 1% platinum on carbon and 6 parts by weight of acidic carbon co-catalyst (Summers U.S. Pat. No. 3,414,616). The autoclave reactor system is purged twice with nitrogen and twice with hydrogen, the agitator started (600 rpm) and the reactor contents heated to 95°–100°C. Hydrogen is fed to the system (7,031 kg/sq cm) and the reactor contents held at 100°–125°C by cooling. After about 20 minutes, the temperature is raised to 145°–150°C and the pressure raised to about 29.8 kg/sq cm. A sample is withdrawn after 30 minutes and analyzed. A sample is taken every 30 minutes thereafter and mono-N-alkyl-p-phenylenediamine content is plotted against time on semilog paper and the plot extrapolated or interpolated to the time required to reach 2% mono-N-alkyl-p-phenylenediamine such time being regarded as the end point of the reaction. The completed batch is cooled and the autoclave vented, the hydrogen pressure being used to discharge the contents through the filter. Analysis of the product obtained gives as an average of two runs 18.6% N,N'-di(1,3-dimethylbutyl)-p-phenylenediamine, 30.6% N,N'-di(1,4-dimethylpentyl)-p-phenylenediamine, and 50.2% N-(1,3-dimethylbutyl)-N'-(1,4-dimethylpentyl)-p-phenylenediamine.

Typical results of reacting different MIBK/MIAK ratios by the aforesaid procedure are summarized in the Table below. The charge of ketones is based on a charge of 138 parts by weight (1 mole) of PNA. Catalyst dosage is 6–7 parts by weight of 1% platinum on carbon and the same amount of acidic carbon black. The hydrogenations are generally effected at 60°–120°C and 7.14 kg/sq cm (nitro reduction), after which the temperature is increased to 145°–180°C and the hydrogen pressure to about 28 kg/sq cm to complete the alkylation. End point of the reaction is determined by the disappearance of monoalkylated product. In the Table "Di C-6" indicates N,N'-di(1,3-dimethylbutyl)-p-phenylenediamine, "Di C-7" indicates symmetrical N,N'-di(sec-alkyl)-p-phenylenediamine having 7 carbon atoms in each alkyl group, namely N,N'-di(1,4-dimethylpentyl)-p-phenylenediamine (from MIAK), N,N'-di(2-heptyl)-p-phenylenediamine (from 2-heptanone) and N,N'-di(2-octyl)-p-phenylenediamine (from 2-octanone) and "mixed" indicates the unsymmetrical N,N'-dialkyl-p-phenylenediamine having 1,3-dimethylbutyl as one alkyl and a 7 or 8 carbon group depending upon the particular higher ketone reactant as the other alkyl.

TABLE I

| Record No. of Product | Ketone Parts by Weight MIBK | MIAK | Mole % of MIBK | Composition of Product Percent by Weight Di C-6 | Di C-7 | Mixed |
|---|---|---|---|---|---|---|
| 68035 | 86 | 196 | 33 | 4.2 | 54.0 | 41.8 |
| 71127 | 80 | 171 | 34 | 4.6 | 50.6 | 42.5 |
| 71125 | 115 | 121 | 50 | 16.7 | 28.5 | 52.6 |
| 71514 | 120 | 154[(1)] | 50 | 21.6 | 27.2 | 51.1 |
| 68034 | 130 | 148 | 50 | 15.8 | 31.3 | 52.9 |
| 71135 | 130 | 148[(2)] | 50 | 12.0 | 32.8 | 53.8 |
| 71134[(3)] | 150 | 171 | 50 | 14.6 | 29.6 | 56.1 |
| 71170 | 138 | 116 | 57.5 | 25.0 | 23.8 | 51.2 |
| 71128 | 150 | 91 | 65 | 35.9 | 11.0 | 49.3 |
| 68037 | 170 | 105 | 65 | 34.6 | 14.2 | 49.4 |
| 71171 | 168 | 82 | 70 | 44 | 10.0 | 45.9 |

[(1)]2-octanone
[(2)]2-heptanone
[(3)]Catalyst charge 7.6 parts by weight and co-catalyst charge 6 parts by weight It will be appreciated that the components of the reaction products do not necessarily total 100% due to experimental error in the analysis. Products No. 71125, 71127 and 71128 show that increasing the mole percent of MIBK from 34 to 50 to 65% in a total of 2.3 moles of ketone increases the Di C-6 component only to about 36%. Products No. 68035, 68034 and 68037 show that similar increase of the mole percent of MIBK in a total of about 2.6 moles of ketone increases the Di C-6 component only to about 35%. Products No. 71170 and 71171 show that increasing the mole percent of MIBK from 57.5 to 70 in a total of about 2.4 moles of ketone produces a product containing less than 50% Di C-6. Products No. 71514 from 2.4 moles total ketone and No. 71135 from 2.6 moles total ketone show that the composition of products from 2-octanone and 2-heptanone are similar to those from MIAK. In every case, more than 40% of the mixed isomer is present and its proportion exceeds that of the Di C-6 component. Preferred are ratios of the ketones which produce no more than about 25% of the Di C-6 component.

Rubber ozone resistance data for the products of this invention are illustrated by a method published by Decker and Wise, The Stress Relaxation Method for Measuring Ozone Cracking, *Rubber World*, April 1962, page 66. The equipment comprises an oven serving as an ozone cabinet filled with ozone generating equipment and racks for both static and dynamic testing. Static racks handle stocks at strains of 5, 10, 20, 30 and 40%. The dynamic rack is a reciprocal mechanism which imparts a 25% strain to the rubber test piece on movement of a top plate which moves vertically with respect to a stationary bottom plate. The mechanism is driven at a rate of 90 cycles per minute by a gear mounted on the outside of the cabinet. The test pieces are 2-inch long T-50 (ASTM D599-55) specimens died from standard stress strain test sheets (ASTM D15-57T). They are mounted by placing the ends in radial slots milled into the edges of circular plates of the racks. The tab ends fit into circumferential grooves machined into the outer surfaces of the plates.

The stress relaxation method is based on the principle that the effective cross-sectional area of a small test piece of rubber is reduced by ozone cracking. The extent of cracking in a test piece is determined by measuring the forces required to extend the test piece 100% before and after exposure to ozone. The ozone concentration for the test is 25 parts ozone/100 million parts air. As the strip begins to crack, the number of stress supporting rubber chains decreases and the force required to extend the strip 100% is reduced. The ratio of this force to the original force is calculated at approximately 16-hour intervals of exposure to ozone. The graph of force vs. time is essentially a straight line and the time required for obtaining 90%, 80% and 70% respectively of the original force is determined from the graph. The ability of the rubber to resist ozone attack is evaluated by comparison of these times to times for suitable controls to reach corresponding percent of the original force. The percents of original moduli of the rubber test pieces are listed as percent retention in the Table infra and the times to reach those retentions are recorded. Longer times indicate better ozone resistance of the rubber stock. The intermittent test comprises 2-hour cycles during which the specimens are exposed dynamically 15% of the time and during the remainder of the time are exposed statically at 25% strain.

The test stock comprises a typical formulation for the sidewall of pneumatic tires. On the basis of 100 parts rubber, all parts being by weight and "oil extended SBR" indicating styrene-butadiene copolymer rubber having about 25% oil present, it comprises:

| | |
|---|---|
| cis-4-Polybutadiene rubber | 30 |

-continued

| | |
|---|---|
| Oil extended SBR | 96 |
| General purpose furnace black | 50 |
| Zinc oxide | 3 |
| Stearic acid | 1 |
| Wax | 5 |
| Sulfur | 2.2 |
| N-tert-butyl-2-benzothiazole-sulfenamide | 1.2 |
| Antidegradant (where present) | 2.0 |

Stock 1 is a control stock containing no antidegradant. Stock 2 is another control stock and contains antidegradant N,N'-di(1,4-dimethylpentyl)-p-phenylenediamine. Stock 3 contains Product No. 68034 and Stock 4 contains Product No. 68035. The stocks are cured in a press and determinations are made on the cured unaged samples and on cured samples aged in an oven for 24 hours at 100°C.

TABLE II

| | Stock | | | |
|---|---|---|---|---|
| | 1 | 2 | 3 | 4 |
| Unaged dynamic ozone resistance: | | | | |
| 90% retention, hours | 3 | 26 | 17 | 26 |
| 80% retention, hours | 5 | 34 | 33 | 37 |
| 70% retention, hours | 8 | 42 | 45 | 50 |
| Unaged static ozone resistance: | | | | |
| 90% retention, hours | 29 | 176 | >208 | >208 |
| Unaged intermittent ozone resistance: | | | | |
| 90% retention, hours | 6 | 67 | 69 | 69 |
| 80% retention, hours | 12 | 96 | 90 | 99 |
| 70% retention, hours | 18 | 109 | 108 | 110 |
| Aged dynamic ozone resistance: | | | | |
| 90% retention, hours | 3 | 10 | 11 | 11 |
| 80% retention, hours | 8 | 19 | 21 | 21 |
| 70% retention, hours | 11 | 27 | 28 | 29 |
| Aged static ozone resistance: | | | | |
| 90% retention, hours | 120 | 168 | 166 | 179 |
| Aged intermittent ozone resistance: | | | | |
| 90% retention, hours | 19 | 23 | 29 | 48 |
| 80% retention, hours | 29 | 67 | 61 | 71 |
| 70% retention, hours | 40 | 93 | 86 | 96 |

The marked improvement in unaged static ozone resistance exhibited by Stocks 3 and 4 is especially significant because the N,N'-dialkyl-p-phenylenediamines are used primarily for short term static ozone protection. They reach the rubber surface more quickly than N-alkyl-N'-phenyl-p-phenylenediamine antidegradants and complement the effect of wax. Wax provides a physical barrier to ozone which gives considerable static protection but the degree of protection is regarded as inadequate in the absence of a chemical antiozonant. Moreover, wax alone is generally detrimental to dynamic protection.

Skin tests on typical rubber compositions of the invention show that they are comparable to control compositions preserved with p-phenylenediamine antiozonants known from long commercial experience to be safe to use. Illustrative of the properties of the new compositions of this invention is the safety to human skin observed from dermatitic tests on human volunteer subjects with rubber preserved with Products No. 68034 and 68035 respectively according to a modified repeated insult patch test method designed to correlate with results conforming to commercial experience. Human subjects not previously exposed to the test materials are subjected to squares of the appropriate test material. After 24 hours the square is removed and sites examined for reaction. After a 24 hour rest period, the test materials are reapplied. After fifteen such applications, a two-week rest period is allowed after which final challenge application is made to the same sites. The test composition comprises, all parts being by weight:

| | |
|---|---|
| Natural rubber | 50 |
| cis-4-Polybutadiene rubber | 30 |
| Oil extended SBR (about 27% oil) | 27.5 |
| High abrasion furnace black | 45 |
| Processing oil | 5 |
| Zinc oxide | 5 |
| Stearic acid | 1 |
| Wax | 2 |
| Sulfur | 2 |
| N-cyclohexyl-2-benzothiazole-sulfenamide | 1 |
| Antidegradant (where present) | 3 |

Appropriate controls without antidegradant and with known p-phenylenediamine antidegradants of established safety are run at the same time. Results with Products No. 68034 and 68035 are comparable to the p-phenylenediamine controls.

In general, the antidegradants of this invention are valuable for the preservation of sulfur-vulcanizable diene rubbers. Those containing more than 50% diene hydrocarbon are preferred. The group of rubbers includes natural rubbers, styrene-butadiene copolymer rubber and the various stereospecific polymerized dienes, for example, cis-polybutadiene and cis-polyisoprene. The compositions are also useful in diene rubbers of low unsaturation such as butyl rubber and ethylene-propylene-diene terpolymer rubber (EPDM). The amount to use will vary depending upon the particular formulation and the purpose of the compounder but, in general, the amounts will fall within the range of 0.1 to 5% of the rubber content.

Stereospecific rubbers are normally obtained as cements and it is important to add antidegradant to the organic solvent composition immediately after polymerization has been completed because these rubbers deteriorate rapidly unless adequately protected immediately after polymerization. The new antidegradants are also suited for addition to latex, for example, to protect the rubber phase of SBR rubber.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. Dialkyl-p-phenylenediamine composition comprising first component of symmetrical N,N'-di(sec-hexyl)-p-phenylenediamine in less than 50% by weight of the total composition, second component of unsymmetrical N-(sec-hexyl)-N'-(sec-alkyl)-p-phenylenediamine having 7 or 8 carbon atoms in said sec-alkyl in amount greater than the first component and greater than 40% of the total composition, and third component of symmetrical N,N'-di(sec-alkyl)-p-phenylenediamine having 7 or 8 carbon atoms in each alkyl group.

2. Composition of claim 1 in which hexyl is 1,3-dimethylbutyl and alkyl, both occurrences, is 1,4-dimethylpentyl.

3. Composition of claim 2 in which the first component is less than 30% by weight of the composition and the second component is greater than 40% to about 56% by weight of the composition.

4. Vulcanizable diene rubber having incorporated therein a stabilizing amount of dialkyl-p-phenylenediamine composition comprising first component of symmetrical N,N'-di(sec-hexyl)-p-phenylenediamine in less than 50% by weight of the total composition, second component of unsymmetrical N-(sec-hexyl)-N'-(sec-alkyl)-p-phenylenediamine having 7 or 8 carbon atoms in said sec-alkyl in amount greater than the first component and greater than 40% of the total composition, and third component of symmetrical N,N'-di(sec-alkyl)-p-phenylenediamine having 7 or 8 carbon atoms in each alkyl group.

5. Composition of claim 4 in which hexyl is 1,3-dimethylbutyl and alkyl, both occurrences, is 1,4-dimethylpentyl.

6. Composition of claim 5 in which the first component is less than 30% by weight of the dialkyl-p-phenylenediamine composition and the second component is greater than 40% by weight of the dialkyl-p-phenylenediamine composition.

7. Vulcanized diene rubber having incorporated therein a stabilizing amount of dialkyl-p-phenylenediamine composition comprising first component of N,N'-di(1,3-dimethylbutyl)-p-phenylenediamine in less than 30% by weight of the total composition, second component of N-(1,3-dimethylbutyl)N'-(1,4-dimethylpentyl)-p-phenylenediamine in amount greater than 40% to about 56% by weight of the total composition and third component of N,N'di(1,4-dimethylpentyl)-p-phenylenediamine.

8. Vulcanized diene rubber of claim 7 in which the rubber is styrene-butadiene copolymer rubber.

* * * * *